May 18, 1954  L. H. ALLEN, JR  2,678,600
COMPRESSION HEAT EXCHANGE APPARATUS
Filed March 5, 1952
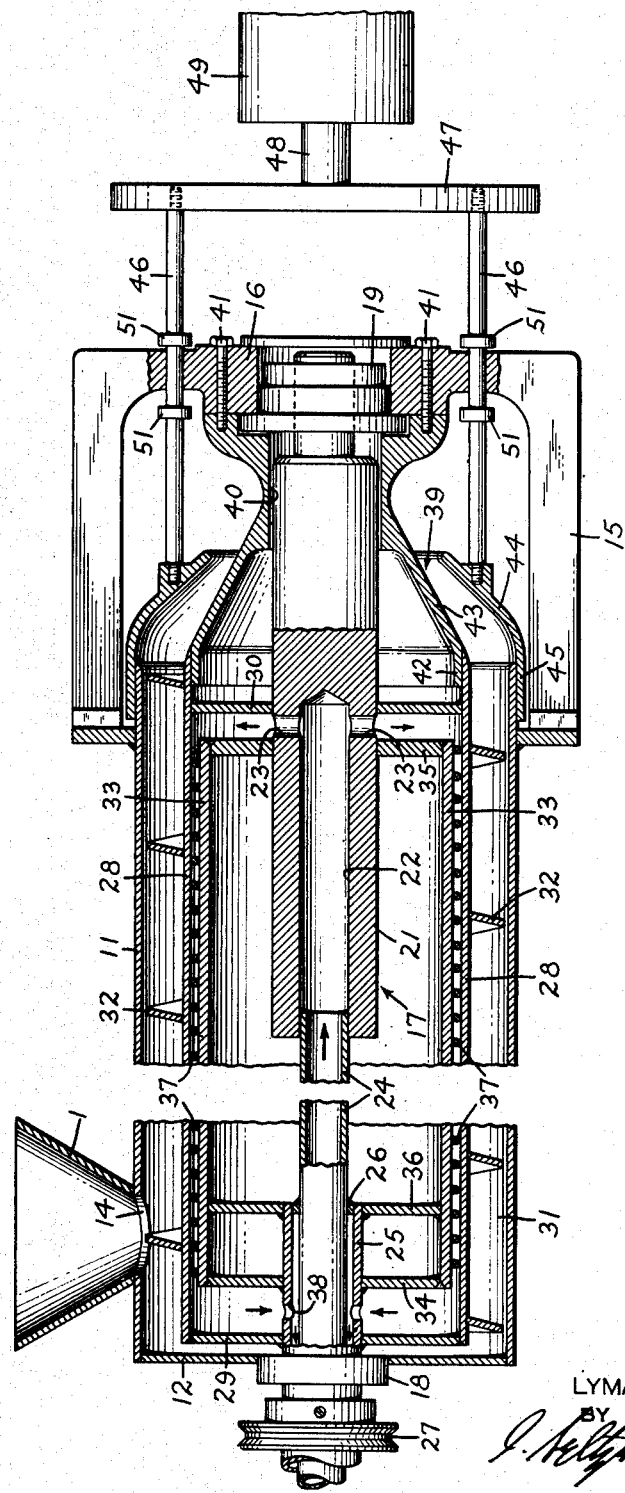
INVENTOR.
LYMAN H. ALLEN, JR.
ATTORNEYS.

Patented May 18, 1954

2,678,600

UNITED STATES PATENT OFFICE 2,678,600

COMPRESSION AND HEAT EXCHANGE APPARATUS

Lyman H. Allen, Jr., Mountain Lakes, N. J., assignor to Celanese Corporation of America, New York, N. Y., a corporation of Delaware Application March 5, 1952, Serial No. 275,005

10 Claims. (Cl. 100—93)

This invention relates to a compression and heat exchange apparatus and is particularly concerned with an apparatus for simultaneously compressing and changing the temperature of a material in the form of a mass of relatively small, compressible particles.

In the production of alkali cellulose by certain processes, the alkali cellulose is obtained in the form of a mass of relatively small, compressible particles that are at an elevated temperature and have a low bulk density. To prepare the alkali cellulose for further use, the same must be cooled and its bulk density increased, the latter to simplify the handling and further treatment of the alkali cellulose. In the interest of economy, the cooling and compression of the alkali cellulose particles should be effected simultaneously. While certain types of apparatus have previously been suggested to accomplish the cooling and compression of a mass of alkali cellulose particles, they have operated at low efficiency and have been extremely large and bulky.

It is an important object of this invention to provide an apparatus for simultaneously compressing and changing the temperature of a material in the form of a mass of relatively small, compressible particles which will be free from the foregoing and other disadvantages.

A further object of this invention is to provide an apparatus for simultaneously compressing and changing the temperature of a material in the form of a mass of relatively small, compressible particles which will operate at high efficiency and be relatively small and light.

Other objects of this invention, together with certain details of construction and combinations of parts, will be apparent from the following detailed description and claims.

According to the present invention, there is provided an apparatus comprising a cylindrical shell having a rotatable shaft extending axially thereof. Mounted on the shaft internally and concentrically of the cylindrical shell is a cylindrical member having a helical screw extending around the periphery thereof and almost into contact with the interior of the cylindrical shell, the cylindrical shell and cylindrical member forming an annular passageway. Means, such as a hopper, are provided for introducing the alkali cellulose particles into said passageway between the cylindrical shell and the cylindrical member, and the alkali cellulose particles are adapted to be moved through the said annular passageway from the feed end to the discharge end of the apparatus by the rotation of the helical screw. To cool the alkali cellulose particles, there is provided a second cylindrical member positioned internally and concentrically of the first cylindrical member and which forms with said first cylindrical member an annular passageway through which a cooling fluid, such as water, may be caused to flow in heat exchange relation with the alkali cellulose particles. The cooling fluid may be introduced into the said annular passageway through the rotatable shaft and may be discharged from the annular passageway, for example, by means of a sleeve communicating therewith and positioned concentrically of the rotatable shaft.

After the alkali cellulose particles are cooled to the desired temperature, they are compressed by being forced through an annular passageway of gradually diminishing cross-sectional area at the discharge end of the apparatus. The annular passageway may, for example, be formed of a pair of inwardly-inclined frusto-conical memmers that are positioned to receive the cooled alkali cellulose particles and are yieldably urged relatively toward each other by any suitable means. The cross-sectional area of the annular passageway tends to decrease because of the inward taper of said frusto-conical members. In addition, further to control the cross-sectional area of the said annular passageway, the taper of the two frusto-conical members may be different. The degree of compression of the alkali cellulose particles will depend on the change in the cross-sectional area of the passageway through which they pass and also on the force with which the frusto-conical members are yieldably urged relatively toward each other. To furnish the necessary force there may be provided a fluid-operated cylinder operatively connected to a frusto-conical member and urging said member toward the other. A fluid-operated cylinder is suited for this purpose because its force may be readily varied and it may be designed so that its force will remain constant despite movement of the frusto-conical member secured thereto. By having the frusto-conical members taper inwardly, it is possible to make the apparatus relatively small and light in weight.

While the apparatus of this invention will now be described specially in connection with the continuous cooling and compressing of alkali cellulose particles for which it is specially adapted, it may be used for either heating or cooling and compressing a mass of relatively small, compressible particles of any type.

A preferred embodiment of this invention is shown in the accompanying drawing wherein the figure is a cross-sectional view of the apparatus.

Referring now to the drawing, the reference numeral 11 designates a cylindrical shell which is open at its discharge end and closed at its feed end by means of a plate 12. Adjacent its feed end, the cylindrical shell 11 is provided with a hopper 13 that leads to an entrance opening 14 through which the alkali cellulose particles may be introduced into the interior of said cylindrical shell. Adjacent its discharge end, there is fastened to the cylindrical shell 11 a framework 15 having an enlarged portion 16 axially spaced from the discharge end of said cylindrical shell. A shaft, indicated generally by reference numeral 17, extends axially of the cylindrical shell 11 and is mounted for rotation in bearings 18 and 19 supported by the plate 12 and the enlarged portion 16 of the frame 15, respectively. The shaft 17 is made of two parts, one of which comprises a rod 21, mounted in the bearing 19, which has a bore 22 extending axially thereof, and a plurality of apertures 23 extending radially therethrough and communicating with the bore 22. The other part of the shaft 17 comprises a pipe-like member 24 projecting through the bearing 18 and extending into the axial bore 22 of the rod 21 to which rod the member 24 is suitably affixed. A sleeve 25 encircles the member 24 adjacent the feed end of the tubular shell 11, and the said sleeve extends through and is rotatably mounted in the bearing 18. The sleeve 25 is concentric with and spaced from the member 24 and is welded thereto at one end as shown at 26, the weld extending around the entire circumference of the said conduit. A pulley 27 is fastened to the sleeve 25 and may be driven from any suitable source, not shown, to cause the same to rotate. The sleeve 25 extends through, and to the left of, the pulley 27, as shown in the drawing, and is provided, at the left, with a suitable drain (not shown).

Positioned concentrically within the cylindrical shell 11 and spaced therefrom is a cylindrical member 28 which is closed adjacent the feed end of the apparatus by means of an end plate 29 fastened to the sleeve 25. The said cylindrical member 28 is also closed adjacent the discharge end of the apparatus by means of a plate 30 which is fastened to the rod 21. The cylindrical shell 11 and the cylindrical member 28 form an annular passageway 31 within which there is provided a helical screw 32 of uniform pitch extending around the periphery of the cylindrical member 28 and of such dimension that it is almost in contact with the interior of the cylindrical shell 11 and which will, when the cylindrical member 28 is rotated in one direction, cause the alkali cellulose particles to move through said annular passageway 31 from the feed end to the discharge end of the apparatus.

A second cylindrical member 33 is positioned internally and concentrically of the cylindrical member 28 and is spaced from the latter. The cylindrical member 33 is shorter than the cylindrical member 28 and is so positioned that its ends are spaced from the plates 29 and 30. One end of the cylindrical member 33 is closed by means of a plate 34 which is fastened to the sleeve 25 and the other end of the cylindrical member 33 is closed by means of a plate 35 which is fastened to the rod 21. Positioned internally of the cylindrical member 33, between its ends, is a plate 36 which is fastened to the end of the sleeve 25 and which acts to brace the structure and make the same more rigid. A length of wire 37 is wrapped in the form of a helix around the periphery of the cylindrical member 33 and the said wire has a diameter substantially equal to the width of the annular passageway between the cylindrical member 33 so that it will be in contact with both of said members.

During operation, a cooling fluid such as water is introduced under pressure into the member 24, which acts as a conduit for the water, from any suitable source, not shown, and flows through the member into the bore 22 and then through the apertures 23 into the space between the plates 30 and 35. The cooling fluid then flows through the annular passageway between the cylindrical member 28 and the cylindrical member 33 and is constrained by the wrap of wire 37 in said passageway to follow a helical path so that all of the cooling fluid will be used efficiently and no undesirable channeling of the cooling fluid will occur. A rapid and efficient cooling of the alkali cellulose particles being moved through the apparatus by the helical screw 32 will accordingly take place. The cooling fluid next flows into the space between the plates 29 and 34 and from said space through apertures 38 in sleeve 25 into the annular discharge passageway between the conduit 24 and the sleeve 25 to the drain of said sleeve.

To compress the alakli cellulose particles, there is provided, adjacent the discharge end of the apparatus, a stationary member 39 having a bore 40 for the passage of the rod 21 and fastened by means of bolts 41 to the enlarged portion 16. The member 39 has a cylindrical skirt 42 fitting into the discharge end of the cylindrical member 28 and an inwardly inclined, frusto-conical section 43 extending axially from the discharge end of said cylindrical member 28. An inwardly tapered, frusto-conical member 44, having a cylindrical shell or skirt 45 extending axially therefrom and toward the feed end of the device overlapping the discharge end portion of the cylindrical shell 11, is positioned concentrically of the member 39. As shown in the drawing, the discharge ends of the cylindrical shell 11 and the cylindrical member 28 are beveled to thin lips so as to avoid placing any check on the movement of alkali-cellulose particles as the said particles are fed by the helical screw 32 into the annular passageway between the frusto-conical member 44 and the frusto-conical section 43 of the member 39. The frusto-conical member 44 is supported by means of a plurality of rods 46 that extend through and are slideably mounted in the enlarged portion 16. The rods 46 are fastened to a plate 47 which is connected to piston rod 48 of a fluid-operated cylinder 49 that acts to urge the frusto-conical member 44 yieldably toward the member 39. The fluid-operated cylinder 49 is of the type in which the force may be readily varied, as desired by the operator, and in which the force will remain constant despite movement of the piston rod 48 and the frusto-conical member 44 connected thereto. The movement of the rods 46 is limited by means of stops 51 fastened thereto. Because the frusto-conical section 43 of the member 39 and the frusto-conical member 44 are inclined inwardly, the cross-sectional area of the annular passageway between said members will tend to decrease toward the discharge end of the apparatus. In addition, the frusto-conical member 44 has a greater degree of taper than the frusto-conical section 43 of the member 39 so that the spacing between said members will decrease toward the discharge end of the apparatus and the cross-sectional area of the annular passageway between said members will decrease at a rapid rate. As a result, when the alkali cellulose particles are forced through said annular passageway, against the pressure developed by the cylinder 49 upon the section 44, they will be compresesd. The degree of compression may be controlled by varying the pressure exerted by the cylinder 49 which will determine the equilibrium position of the frusto-conical member 44 during operation.

To increase the efficiency of cooling, means, such as pins projecting inwardly from the wall of the cylindrical shell 11, may be provided, along a section of the length of said shell, to stir the alkali cellulose particles during their passage through the apparatus, the screw 32 being provided with spaced notches so as to clear these pins. The cooling of the alkali cellulose particles in the apparatus in this case takes place with increased efficiency because the particles are tumbled about and brought into contact with the cooling surface during the cooling step. The apparatus may also be equipped with an external cooling jacket if desired in any conventional manner.

It is to be understood that the foregoing detailed description is given merely by way of illustration and that many variations may be made therein without departing from the spirit of my invention.

Having described my invention, what I desire to secure by Letters Patent is:

1. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to pass, means for bringing a heat transfer medium into heat exchange relationship with the particles as they pass through the annular passageway, and a pair of spaced, inwardly-directed, frusto-conical members forming an annular passageway of decreasing cross-sectional area positioned to receive the particles and compress the same during their passage therethrough.

2. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to be passed, means for bringing a heat transfer medium into heat exchange relationship with the particles as they are passed through the annular passageway, and a pair of spaced, inwardly-directed, frusto-conical members forming an annular passageway of decreasing cross-sectional area positioned to receive the particles and compress the same during their passage therethrough, the outer of said frusto-conical members having a greater inward taper than the inner of said frusto-conical members whereby the cross-sectional area of the annular passageway between said members decreases at a rapid rate.

3. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to be passed, means for bringing a heat transfer medium into heat exchange relationship with the particles as they are passed through the annular passageway, a pair of spaced, relatively movable, inwardly-directed, frusto-conical members forming an annular passageway of decreasing cross-sectional area positioned to receive the particles and compress the same during their passage therethrough, and means yieldably urging said frusto-conical members relatively toward each other.

4. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to be passed, means for bringing a heat transfer medium into heat exchange relationship with the particles as they are passed through the annular passageway, a pair of spaced, relatively movable, inwardly-directed, frusto-conical members forming an annular passageway of decreasing cross-sectional area positioned to receive the particles and compress the same during their passage therethrough, the outer of said frusto-conical members having a greater inward taper inwardly than the inner of said frusto-conical members whereby the cross-sectional area of the annular passageway between said members decreases at a rapid rate and a fluid-operated cylinder yieldably urging said frusto-conical members relatively toward each other.

5. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to be passed, means for bringing a heat transfer medium into heat exchange relationship with the particles as they are passed through the annular passageway, a helical screw of uniform pitch extending around the periphery of the cylindrical member and extending radially outwardly therefrom almost into contact with the interior of the cylindrical shell for passing particles through the annular passageway, and a pair of spaced, inwardly-directed, frusto-conical members forming an annular passageway of decreasing cross-sectional area positioned to receive the particles and compress the same during their passage therethrough.

6. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to be passed, means for bringing a heat transfer medium into heat exchange relationship with the particles as they are passed through the annular passageway, a helical screw of uniform pitch extending around the periphery of the cylindrical member and extending radially outwardly therefrom almost into contact with the interior of the cylindrical shell for passing the particles through the annular passageway, a pair of spaced, relatively movable, inwardly-directed, frusto-conical members forming an annular passageway of decreasing cross-sectional area positioned to receive the particles and compress the same during their passage therethrough, the outer of said frusto-conical members being more highly inclined inwardly than the inner of said frusto-conical members whereby the cross-sectional area of the annular passageway between said members decreases at a rapid rate, and a fluid-operated cylinder yieldably urging said frusto-conical members relatively toward each other.

7. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to be passed, a second cylindrical member mounted on said shaft internally and concentrically of said first cylindrical member and forming with said first cylindrical member a second annular passageway for bringing a heat transfer medium into heat exchange relationship with the particles as they are passed through the first annular passageway, and a pair of spaced, inwardly-directed, frusto-conical members forming an annular passageway of decreasing cross-sectional area positioned to receive the particles and compress the same during their passage therethrough.

8. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to be passed, a second cylindrical member mounted on said shaft internally and concentrically of said first cylindrical member and forming with said first cylindrical member a second annular passageway for bringing a heat transfer medium into heat exchange relationship with the particles as they are passed through the first annular passageway, the rotatable shaft having a passageway extending longitudinally thereof and communicating with the second annular passageway for introducing the heat transfer medium into the second annular passageway, a sleeve mounted concentrically on said shaft and spaced therefrom and communicating with the second annular passageway for discharging the heat transfer medium from the second annular passageway, and a pair of spaced, inwardly-directed, frusto-conical members forming an annular passageway of decreasing cross-sectional area positioned to receive the particles and compress the same during their passage therethrough.

9. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to be passed, a second cylindrical member mounted on said shaft internally and concentrically of said first cylindrical member and forming with said first cylindrical member a second annular passageway for bringing a heat transfer medium into heat exchange relationship with the particles as they are passed through the first annular passageway, a helical wire wrap extending around the periphery of the second cylindrical member for directing said medium in a helical path in said second annular passageway, and a pair of spaced, inwardly-directed, frusto-conical members forming an annular passageway of decreasing cross-sectional area positioned to receive the particles and compress the same during their passage therethrough.

10. In an apparatus for changing the temperature of and compressing a mass of relatively small, compressible particles, the combination with a cylindrical shell, of a rotatable shaft extending axially of said cylindrical shell, a cylindrical member mounted on said shaft internally and concentrically of said cylindrical shell and forming with said cylindrical shell an annular passageway through which the particles are adapted to be passed, a helical screw of uniform pitch extending around the periphery of the cylindrical member almost into contact with the interior of the cylindrical shell for passing the particles through the annular passageway, a second cylindrical member mounted on said shaft internally and concentrically of said first cylindrical member and forming with said first cylindrical member a second annular passageway for bringing a heat transfer medium into heat exchange relationship with the particles as they are passed through the first annular passageway, a helical wire wrap extending around the periphery of the second cylindrical member for directing said medium in a helical path in said second annular passageway, the rotatable shaft having a passageway extending longitudinally thereof and communicating with the second annular passageway for introducing the heat transfer medium into the second annular passageway, a sleeve mounted concentrically on said shaft and spaced therefrom and communicating with the second annular passageway for discharging the heat transfer medium from the second annular passageway, a pair of spaced, inwardly-directed, frusto-conical, relatively movable members forming an annular passageway of decreasing cross-sectional area positioned to receive the particles and compress the same during their passage therethrough, the outer of said frusto-conical members having a greater inward taper than the inner of said frusto-conical members whereby the cross-sectional area of the annular passageway between said members decreases at a rapid rate, and a fluid-operated cylinder yieldably urging said frusto-conical members relatively toward each other.

References Cited in the file of this patent

UNITED STATES PATENTS

| Number | Name | Date |
|---|---|---|
| 1,750,916 | Anderson et al. | Mar. 18, 1930 |